United States Patent [19]
Yako

[11] 4,276,579
[45] Jun. 30, 1981

[54] PHOTOGRAPHIC FLASH DEVICE

[75] Inventor: Hikoya Yako, Osaka, Japan

[73] Assignee: West Electric Co., Ltd., Osaka, Japan

[21] Appl. No.: 24,909

[22] Filed: Mar. 29, 1979

[30] Foreign Application Priority Data

Jul. 4, 1978 [JP] Japan .............................. 53/46212[U]

[51] Int. Cl.³ .............................................. G03B 15/02
[52] U.S. Cl. ........................................... 362/5; 362/18; 362/277
[58] Field of Search ............................. 362/18, 5, 277

[56] References Cited

U.S. PATENT DOCUMENTS

| | | | |
|---|---|---|---|
| 4,141,059 | 2/1979 | Shiojiri | 362/18 |
| 4,190,880 | 2/1980 | Esaki | 362/16 |

Primary Examiner—Stephen J. Lechert, Jr.
Attorney, Agent, or Firm—Burgess, Ryan and Wayne

[57] ABSTRACT

In a photographic exposure device of the type comprising a flash section comprising a flash tube which flashes by the energy charged on a main discharge capacitor and a reflector, and a flash light emission angle variable mechanism capable of varying the flash light emission angle by changing the position from said flash section, an exposure data section on which are displayed an aperture, a film sensitivity or speed, a distance to a subject and other useful data for photography is connected to said flash light emission angle variable mechanism by a connecting mechanism in such a way that when the flash light emission angle is made variable by said flash light emission angle variable mechanism the exposure data displays may be changed.

2 Claims, 6 Drawing Figures

FIG. 3A  FIG. 3B
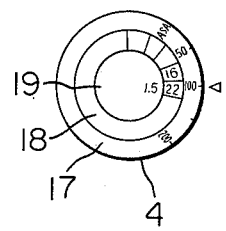
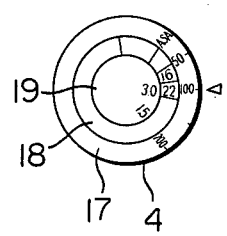
FIG. 4A
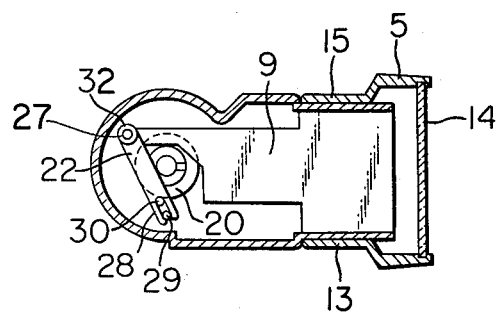
FIG. 4B
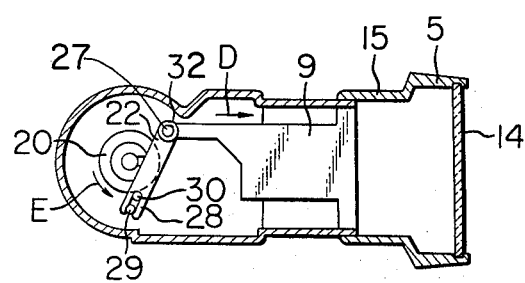

PHOTOGRAPHIC FLASH DEVICE

BACKGROUND OF THE INVENTION

The present invention relates to a photographic flash device which is an artificial light source in the case of photography and more particularly a photographic flash device capable of easily varying the flash light or beam emission angle from a flash tube.

Of the photographic flash devices of the type described, a type wherein various transparent panels such as wide, standard, telescope and so on are detachably mounted on the front face of a flash section comprising a flash tube which flashes by the energy charged on a main discharge capacitor and a reflector and a type wherein the position from the front face of the flash section of a single transparent panel is variable so that wide-angle, standard and telescope lenses may be used with a camera for photography are used in practice.

As compared with the former type, the latter type wherein the position of the single transparent panel is variable has a feature that the flash light emission angle may be readily varied by a single operation. However, in the case of photography it is needed to obtain the exposure data. For instance, in the case of a flash device wherein an automatic flash emission control is possible, this exposure data is such that a distance range in which flash exposures are possible (to be referred to as "the flash exposure range" in this application) is read out when the flash light emission angle is variable with respect to the film speed that is used and the aperture of the camera that is set.

These reading operations are extremely difficult for beginners so that erratic readings result.

SUMMARY OF THE INVENTION

Accordingly, one of the objects of the present invention is to provide a photographic flash device wherein the exposable distance range may be automatically changed when the flash light emission angle is made variable so that it is not needed to obtain the allowable flash exposure distance range by the operations of other exposure data.

BRIEF DESCRIPTION OF THE DRAWINGS

FIGS. 3A and 3B are top views of an exposure data section of the photographic flash device shown in FIG. 1; and FIGS. 4A and 4B are sectional views showing the rotating operations of a distance ring caused by the sliding movement of the mount.

DESCRIPTION OF THE PREFERRED EMBODIMENTS

Figure 1:
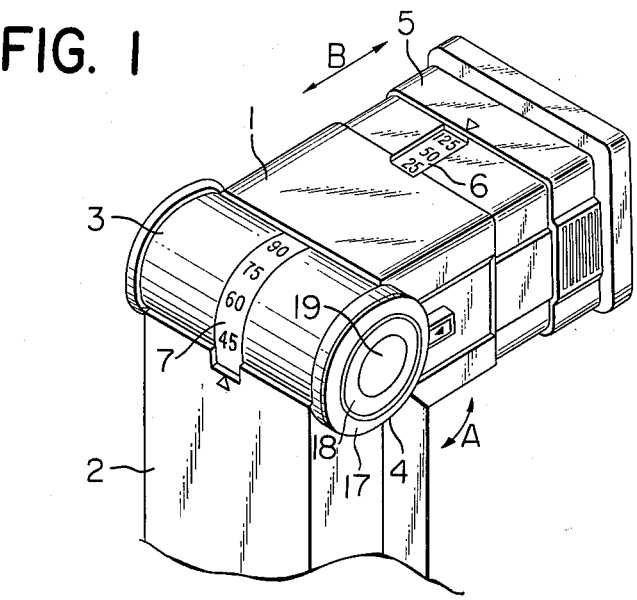
FIG. 1 is a perspective view of a photographic flash device in accordance with the present invention.

In FIG. 1 is shown in perspective an embodiment of a photographic flash device in accordance with the present invention. 1 is a first main body housing a flash tube (not shown), a reflector (not shown) and the like; 2, a second main body housing a power supply and electric circuits; 3, a connector for interconnecting between the first and second main bodies 1 and 2 in such a way that they may be swung in the directions indicated by the double-pointed arrow A; 4, a photographic or exposure data section bearing film speeds, apertures, distances to a subject and the like; 5, a transparent panel mount which has a transparent panel at its front end and which is connected to the first main body 1 and the exposure data section 4 in such a way that the mount 5 may be slidable relative to the first main body and that the exposure data section 4 may be movable.

There is also provided an angle indicator 6 on the main body 1 so that the angle of emission of the flash beam from the flash tube may be varied by sliding the mount 5. An angle indicator 7 is provided for indicating the angle of rotation in the direction indicated by the double-pointed arrow A of the first main body 1 relative to the second main body 2.

Figure 2:
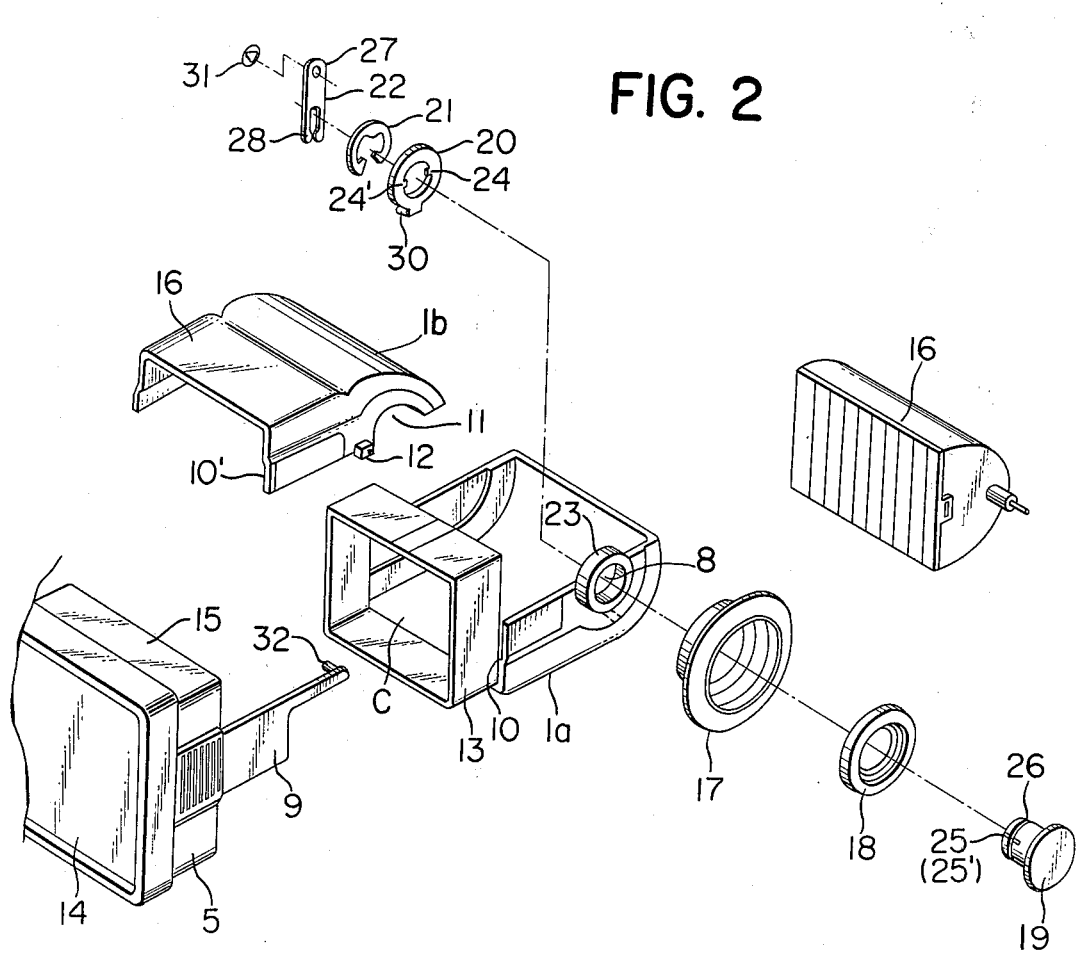
FIG. 2 is an exploded perspective view of a first main body, an exposure data section and a mount of the device shown in FIG. 1.

FIG. 2 shows in exploded view the exposure data section and the first main body. The first main body 1 is divided into a lower section 1a and an upper section 1b. The lower section 1a is formed with a mounting hole 8 for mounting the data section 4, a recess 10 in which slides a sliding arm 9 of the mount 5 and a barrel section 13. The upper section 1b is formed with a recess 10' in which slides the sliding arm 9, a recess or cutout portion 11 and an exposure data index 12. The mount 5 comprises the transparent panel 14, the sliding arm 9 which slides in the recesses 10 and 10' of the first main body 1 and a barrel 15 which slidably fits over the barrel section 13 of the lower section 1a of the first main body 1. 16 is a flash section which comprises a flash tube and a reflector and is mounted in a space C in the first frame body.

The exposure data section 4 mainly comprises a film speed ring 17 rotatably fitted over the flange 23 of the hole 8, an aperture ring 18 which is rotatably fitted over the film speed ring 17 and has aperture values marked on the upper surface along the periphery thereof and a distance-to-subject ring 19 which is rotatably fitted over the aperture ring 18 and has distances marked on the upper surface along the periphery thereof.

In assembly, the film speed ring 17 is first mounted on the flange 23 of the hole 8. Next the aperture ring 18 is fitted over the film speed ring 17 and then the distance ring 19 is fitted over the aperture ring 18. Thereafter a rotary ring 20 for rotating the distance ring 19 is fitted in such a way that projections 24 and 24' are slidable in grooves 25 and 25' of the distance ring 19 (the groove 25' being formed in opposed relationship with the groove 25). Furthermore, an annular groove 26 formed in the cylindrical portion of the distance ring 19 is tightened with an E ring 21 which has elasticity and is made of a metal so that the rotary ring 20 may be prevented from falling off. Finally the rings 17, 18 and 19 are mounted on the lower section 1a of the first main body 1. With this construction, the distance ring 19 may rotate in unison with the rotary ring 20.

In order to connect the sliding panel 9 of the mount 5 and the rotary ring 20, a connecting plate 22 which has a hole 28 into which is inserted a projection 29 (see FIGS. 4A and 4B) extended from the interior of the lower section 1a of the main body 1 and a hole 27 into which are inserted a projection 32 of the sliding panel 9 and a projection 30 of the rotary ring 20 is mounted on the lower section 1a. In mounting, the hole 28 is fitted over the projection 29 and a toothed washer 31 is fitted so as to securely retain the projection 29 in position so that it may not pulled out of the hole 28. In this case, the projection 30 is inserted into the hole 28. Thereafter the sliding panel 9 is caused to slide in the recess 10 and the projection 32 at the leading end thereof is inserted into the hole 27. Finally the upper section 1b of the main frame body is mounted on the lower section 1a. Because of the arrangement described above, the distance ring 19 is rotated through the rotary ring 20 in response to the sliding movement of the mount 5.

The mode of operation of the device which is assembled in the manner described above is shown in FIGS. 3A, 3B, 4A and 4B. FIGS. 3A and 3B are top views of the data section 4 when the flash beam emission angles are varied to for instance 25 and 125 degrees. FIGS. 4A and 4B are sectional views showing the rotary operation of the rotary ring 20 caused by the movement of the mount 5 in FIGS. 3A and 3B.

In FIGS. 4A and 4B when the sliding movement of the mount 5 on the main first body 1 is stopped in order to obtain the flash light emission angle of 125 degrees, the connecting plate 22 and the rotary ring 20 are brought to the states shown. As shown in FIG. 3A, the exposure data section 4 displays the film speed ASA 100, the aperture F22 and the distance-to-subject D1.5 m. When the mount 5 is drawn in the direction indicated by the arrow D in FIG. 4B in order to attain the flash light emission angle of 25 degrees, the connecting plate 22 is also displaced in the direction indicated by the arrow D. The displacement in the direction indicated by the arrow D of the connecting plates results in the displacement in the direction indicated by the arrow E of the projection 30 because the projection 29 which is inserted into the hole 28 is held stationary. As a consequence, the rotary ring 20 rotates in the direction indicated by the arrow F so that the distance ring 19 also rotates and the distance display on the exposure data section changes to D3 m. When the flash light emission angle is 25 degrees, it indicates that with ASA 100 and F22, the allowable flash exposure range is up to three meters.

Next when it is desired to change the film speed and the aperture, their respective rings 17 and 18 are rotated independently of each other and the distance corresponding to their changes is read out. Furthermore it suffices to read out the distance information corresponding to the changes in flash light emission angle by means of the sliding movement of the mount 5.

In the illustrative embodiment of the present invention described above, the flash exposure range can be varied, but the present invention is not limited thereto. For instance, it is of course possible to change the aperture by changing the aperture ring.

What is claimed is:

1. A photographic flash device having a flash section comprising a flash tube which flashes by means of the energy charged on a main discharge capacitor and a reflector, a flash light emission angle variable mechanism which has a single transparent panel and which can vary the flash light emission angle by changing the distance of said panel from said flash tube, a flash light emission angle display coupled to and controlled by said flash light emission angle variable mechanism, an exposure information section upon which are displayed aperture, film speed, and distance to a subject, and a connecting mechanism which interconnects said flash light emission angle variable mechanism and said exposure data section so that the displays of said exposure data section may be varied when the flash light emission angle is varied by means of said flash light emission angle variable mechanism, whereby the operation of said flash light emission angle variable mechanism correspondingly varies the display of the flash light emission angle and the exposure information.

2. A photographic flash device as set forth in claim 1, further comprising a main body, wherein said exposure data section comprises an aperture plate, a film speed plate, and a distance-to-a-subject plate which may change relative positions, and a mounting mechanism for mounting said exposure data plates on said main body, said flash section being connected to said mounting mechanism in such a way that the position change operations of said exposure data plates may be permitted; said connecting mechanism comprising (i) a first operating member which is connected to said mounting mechanism so as to operate in cooperation with the operations of said exposure data plates, and (ii) a second operating member for connecting said flash light emission angle variable mechanism to said first operating member.

* * * * *

UNITED STATES PATENT AND TRADEMARK OFFICE
CERTIFICATE OF CORRECTION

PATENT NO. : 4276579
DATED : June 30, 1981
INVENTOR(S) : Hikoya Yako

It is certified that error appears in the above—identified patent and that said Letters Patent is hereby corrected as shown below:

Column 3, line 34, change "arrow F" to --arrow E--.

Signed and Sealed this

Twenty-sixth Day of October 1982

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,276,579
DATED : June 30, 1981
INVENTOR(S) : Hikoya Yako

It is certified that error appears in the above—identified patent and that said Letters Patent is hereby corrected as shown below:

In the Title Page, Foreign Application Priority Data,

"July 4, 1978" should be --April 7, 1978 --.

Signed and Sealed this

First Day of March 1983

[SEAL]

Attest:

GERALD J. MOSSINGHOFF

Attesting Officer     Commissioner of Patents and Trademarks